(12) United States Patent
Wegener et al.

(10) Patent No.: US 7,926,335 B2
(45) Date of Patent: Apr. 19, 2011

(54) METHOD AND DEVICE FOR DIAGNOSING A DIVERTER VALVE OF AN INTERNAL COMBUSTION ENGINE HAVING A COMPRESSOR

(75) Inventors: Sabine Wegener, Tamm (DE); Lutz Reuschenbach, Stuttgart (DE); Patrick Menold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 12/288,005

(22) Filed: Oct. 14, 2008

(65) Prior Publication Data

US 2009/0114003 A1 May 7, 2009

(30) Foreign Application Priority Data

Oct. 30, 2007 (DE) .......................... 10 2007 051 872

(51) Int. Cl.
*G01M 15/04* (2006.01)
(52) U.S. Cl. .................. 73/114.79; 73/114.77
(58) Field of Classification Search ............... 73/114.77, 73/114.79; 60/600, 611
See application file for complete search history.

(56) References Cited

U.S. PATENT DOCUMENTS

| | | | | |
|---|---|---|---|---|
| 5,095,703 | A * | 3/1992 | Okimoto et al. ................ | 60/612 |
| 6,227,812 | B1 * | 5/2001 | Kawaguchi et al. ........ | 417/222.2 |
| 6,273,076 | B1 * | 8/2001 | Beck et al. .................... | 123/679 |
| 6,938,420 | B2 * | 9/2005 | Kawamura et al. ............. | 60/612 |
| 6,959,697 | B2 * | 11/2005 | Kojima .......................... | 123/516 |
| 7,251,989 | B2 * | 8/2007 | Baeuerle .................... | 73/114.37 |
| 7,500,363 | B2 * | 3/2009 | Hara et al. ...................... | 60/611 |
| 7,578,128 | B2 * | 8/2009 | Miyauchi et al. ............... | 60/611 |
| 7,654,086 | B2 * | 2/2010 | Gong et al. ..................... | 60/611 |
| 7,677,227 | B2 * | 3/2010 | Sagisaka et al. ........... | 123/559.1 |
| 2006/0248889 | A1 * | 11/2006 | Sagisaka et al. ................ | 60/602 |
| 2008/0022679 | A1 * | 1/2008 | Hara et al. ...................... | 60/602 |
| 2008/0022968 | A1 * | 1/2008 | Miyauchi et al. ......... | 123/339.15 |

* cited by examiner

*Primary Examiner* — Freddie Kirkland, III
(74) *Attorney, Agent, or Firm* — Kenyon & Kenyon LLP

(57) ABSTRACT

A method for diagnosing a diverter valve of an internal combustion engine having a compressor is provided, for which diagnosis a variation over time of a charging pressure of the internal combustion engine as a result of a predefined triggering of the diverter valve is analyzed, the triggering of the diverter valve taking place in such a way that a diverter valve moved in the direction of its closing position is expected. Depending on the resulting variation over time of the charging pressure, an open jamming diverter valve is diagnosed if the variation over time of the charging pressure is not plausible with an expected variation over time for a diverter valve moved in the direction of its closing position.

19 Claims, 5 Drawing Sheets

METHOD AND DEVICE FOR DIAGNOSING A DIVERTER VALVE OF AN INTERNAL COMBUSTION ENGINE HAVING A COMPRESSOR

BACKGROUND OF THE INVENTION

1. Field of the Invention

The present invention is directed to a method and a device for diagnosing a diverter valve of an internal combustion engine having a compressor.

2. Description of Related Art

Turbocharged engines today often have a so-called diverter valve which functions in load changes to prevent pumping of the turbocharger and/or pressure peaks when the throttle valve is closed. In modern engines, the diverter valve is often triggered by a control signal generated by the engine electronic system to open it in a controlled manner when there is a risk of pumping. The diverter valve is a type of switching component. Typical error cases for such a switching component include closed jamming and open jamming. A diverter valve that jams when open may have a negative effect on the dynamics of the charging pressure buildup because some of the volume flow delivered by the compressor of the turbocharger is pumped uselessly in circulation. In the worst case, it may even result in the desired charging pressure no longer being achieved and the charging pressure diagnosis finding an undercharging error.

BRIEF SUMMARY OF THE INVENTION

The method and device according to the present invention for diagnosing a diverter valve of an internal combustion engine have the advantage over the related art that a variation over time of a charging pressure of the internal combustion engine as a result of a predefined triggering of the diverter valve is analyzed for the diagnosis, the triggering of the diverter valve taking place in such a way that a diverter valve moved in a direction of its closing position is expected and, that depending on the established variation over time of the charging pressure, a diverter valve that jams when open is diagnosed when the variation over time of the charging pressure is not plausible with an expected variation over time for a diverter valve moved in the direction of its closing position. This makes it possible to diagnose a diverter valve that jams when open.

It is advantageous in particular that, when triggering of the diverter valve in the direction of its open position is suspended in the transition from a higher load at which the diverter valve is triggered into the closing position to a lower load of the internal combustion engine, a check is performed to determine whether compressor pumping has occurred as a result, and if it is found that no compressor pumping has occurred, a defectively open jamming diverter valve is recognized. In this way, a defectively open jamming diverter valve may be detected very reliably.

Another advantage is obtained when, starting from an operating state having an open diverter valve, the diverter valve is triggered into its closing direction, and for the case when due to the triggering of the diverter valve into the closing direction, no increase in charging pressure above a predefined threshold value is detected, a defectively open jamming diverter valve is diagnosed. In this way, diagnosis of a defectively open jamming diverter valve may be performed even in normal operation of the internal combustion engine without having to accept unwanted compressor pumping for the diagnosis.

It is also advantageous that a check is performed to determine whether a predefined charging pressure is reached in triggering the diverter valve into the closing direction such that, if this is not the case, in particular within a predefined period of time, the check for an open jamming diverter valve is activated. This prevents the diagnosis for an open jamming diverter valve from being performed with unnecessary frequency and the diagnosis is activated only when an open jamming diverter valve is suspected.

It is also advantageous if the test for an open jamming diverter valve is activated in an adaptation of charging pressure in which an adaptation variable for maintaining a predefined charging pressure has reached a predefined limiting value. Again in this way, activation of the diagnosis for a frequently open jamming diverter valve at an unwanted frequency is prevented and this ensures that the diagnosis for an open jamming diverter valve is activated only when an open jamming diverter valve is suspected.

DETAILED DESCRIPTION OF THE INVENTION

Figure 1:
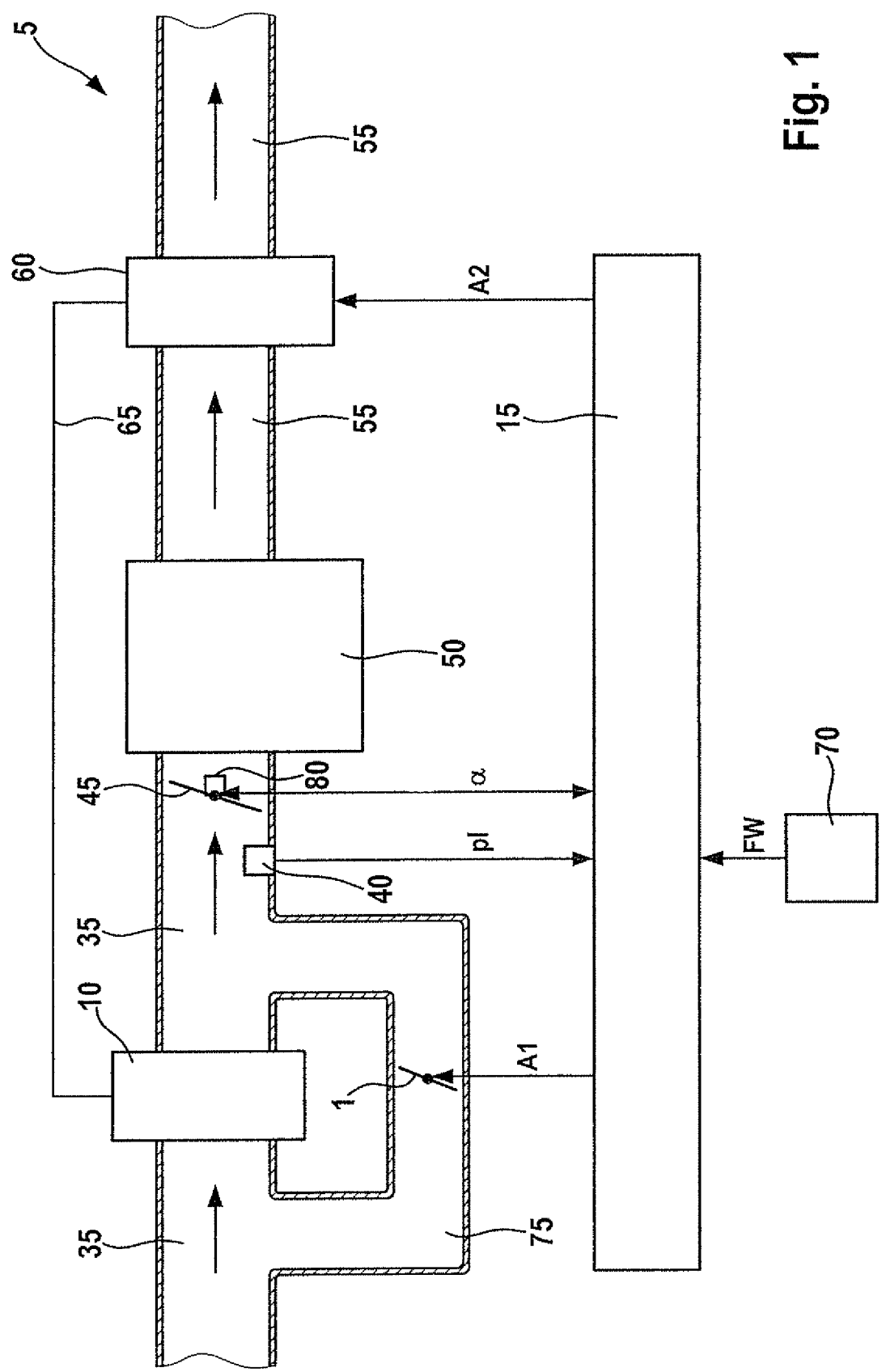
FIG. 1 shows a schematic view of an internal combustion engine.

FIG. 1 shows an internal combustion engine 5, which may drive a motor vehicle, for example. Internal combustion engine is designed as a gasoline engine or as a diesel engine, for example. Internal combustion engine 5 includes one or more cylinders 50 to which fresh air is supplied through an air supply 35. The direction of flow of the fresh air in air supply 35 is represented by arrows in FIG. 1. A compressor of an exhaust gas turbocharger is situated in air supply 35 which compresses the fresh air supplied to cylinder(s) 50 and is driven via a shaft 65 of a turbine 60 in an exhaust tract 55 of an internal combustion engine 5. Alternatively, compressor 10 may also be a compressor driven by a crankshaft of internal combustion engine 5 or an electrically driven compressor. FIG. 1 shows a bypass channel 75 of air supply 35 bypassing compressor 10, which includes a diverter valve 1, the degree of opening of which is set via a first trigger signal A1 from an engine controller 15. Downstream from compressor 10, a charging pressure sensor 40 is provided in air supply 35, measuring charging pressure pl and forwarding the measured values to engine controller 15. Downstream from charging pressure sensor 40, a throttle valve 45 is provided in air supply 35, its degree of opening α being measured by a throttle valve position sensor 80, e.g., a potentiometer, and its measured values forwarded to engine controller 15. Conversely, engine controller 15 controls throttle valve 45 to set a desired degree of opening. A second trigger signal A2 is sent to turbine 60 in exhaust tract 55 of the internal combustion engine with the goal of influencing the driving power of turbine 60 and thus influencing the compressor performance of compressor 10, e.g., to set a desired setpoint charging pressure plsetpoint. This may be accomplished by influencing the turbine geometry or by influencing the degree of opening of a wastegate of turbine 60 in a manner known to those skilled in the art. Furthermore, an accelerator pedal module 70 is provided, via which the driver of the motor vehicle is able to preselect, on the basis of the accelerator pedal position, a desired propulsion in the form of a so-called driver's desired torque FW of engine controller 15. The degree of opening of throttle valve 45 and the driving power of turbine 60 are then set depending on the driver's desired torque FW and, if necessary, other torque demands from other control units or vehicle functions, although these are not shown in FIG. 1 for the sake of simplicity. In the transition from higher loads to lower loads, i.e., from high mass flows to low mass flows and from high charging pressures of internal combustion engine 5 to low charging pressures, diverter valve 1 is triggered by first trigger signal A1 in such a way that it moves into its opening direction to avoid unwanted compressor pumping. The degree of opening α of the throttle valve, the mass flow through the throttle valve, the relative air charge or the driver's desired torque FW, for example, may be used as the signal for the load.

Alternatively, the physical conditions such as the pressure ratio and volume flow through the compressor may also be analyzed and the diverter valve is opened in a controlled manner when the conditions reach or approach the range of compressor pumping.

Figure 2:
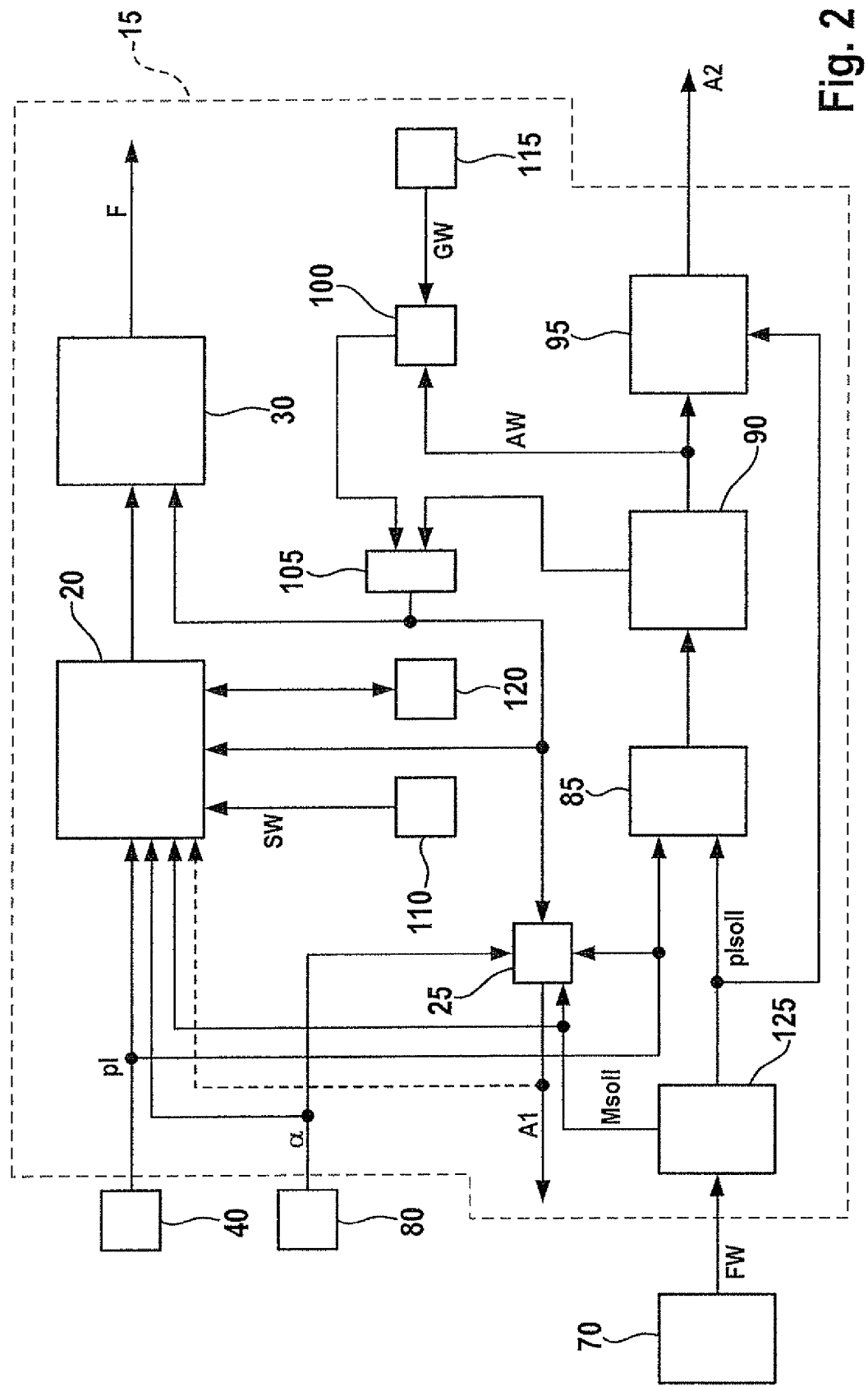
FIG. 2 shows a schematic function diagram illustrating an example embodiment of the device according to the present invention.

FIG. 2 shows a function diagram of the device according to the present invention, which may be implemented, e.g., in software and/or hardware in engine controller 15. For the sake of simplicity, it is assumed below that the device according to the present invention is identical to engine controller 15, only the elements necessary for the present invention being shown in the function diagram in FIG. 2. Device 15 according to the present invention thus includes a setpoint value forming unit 125, which forms charging pressure setpoint value plsetpoint and, in a manner not shown here, a setpoint value for the degree of opening of throttle valve 45 in a manner known to those skilled in the art, depending on the driver's desired torque FW supplied by accelerator pedal module 70 and, if necessary, additional torque demands, in such a way that the driver's desired torque FW or a setpoint torque of internal combustion engine 5 to be set as a result of all torque demands is implemented. Charging pressure setpoint value plsetpoint is sent to a first comparison unit 85 to which charging pressure actual value pl is also sent by charging pressure sensor 40. First comparison unit 85 checks on whether charging pressure actual value pl is less than charging pressure setpoint value plsetpoint. In this case, first comparison unit 85 delivers a set signal to an adaptation unit 90. Adaptation unit 90 checks on how much time charging pressure actual value pl requires to reach charging pressure setpoint value plsetpoint, i.e., how long a set signal has been received by first comparison unit 85 without interruption. Depending on the time thereby ascertained, adaptation unit 90 forms an adaptation value AW for triggering the geometry, i.e., the wastegate of turbine 60, and relays it to a second trigger unit 95. Second trigger unit 95 also receives charging pressure setpoint value plsetpoint. Second trigger unit 95 forms a baseline value for the second trigger signal, depending on charging pressure setpoint value plsetpoint, and adaptation value AW is additively superimposed on the baseline value or the second trigger signal. The sum formed in this way then constitutes second trigger signal A2 for the turbine geometry, i.e., the wastegate opening. Adaptation unit 90 also checks on whether the time ascertained during which a set signal was received without interruption by first comparison unit 85 is greater than a predefined threshold value T. If this is the case, then adaptation unit 90 delivers a set signal to an OR element 105 at a second output. However, if the time of a set signal received without interruption by first comparison unit 85, which is ascertained by adaptation unit 90, is less than or equal to predefined threshold value T, then adaptation unit 90 delivers a reset signal to OR element 105. In a second comparison unit 100, adaptation value AW of an adaptation unit 90 is compared with a limiting value GW from a limiting value memory 115. Limiting value GW may be calibrated suitably on a test stand and/or in driving tests, for example, and represents an adaptation limit for adaptation value AW, which should not be exceeded or, if exceeded, indicates the existence of an error state. Thus, if second comparison unit 100 finds that adaptation value AW is greater than limiting value GW, then second comparison unit 100 delivers a set signal to OR element 105; otherwise it delivers a reset signal. OR element 105 delivers a set signal at its output when a set signal is applied to at least one of its inputs; otherwise the OR element delivers a reset signal. The output of OR element 105 is sent to a first trigger unit 25 and analyzer unit 20 and a diagnosis unit 30. First trigger unit 25 also receives resulting setpoint torque Msetpoint from setpoint value forming unit 125. Setpoint value forming unit 125 forms this resulting setpoint torque Msetpoint from the driver's desired torque FW and, if necessary, other torque demands of additional control systems or vehicle functions, and then forms charging pressure setpoint value plsetpoint as well as a setpoint value for the degree of opening of throttle valve 45 (not shown in FIG. 2 for reasons of simplicity) and, if necessary, one or more setpoint values for additional manipulated variables such as combustion chamber charge, injection quantity and, in the case of a gasoline engine, firing angle, etc., to set the setpoint value for torque Msetpoint.

As an alternative to resulting setpoint torque Msetpoint, the setpoint value for the combustion chamber charge, which is also ascertained in setpoint value forming unit 125, may also be supplied to first trigger unit 25 and to analyzer unit 20. The exemplary embodiment is described below on the basis of setpoint torque Msetpoint. However, it may also function in a similar manner by using the setpoint value for the compression chamber charge instead of the setpoint torque, thereby further increasing the diagnostic precision. With the setting of the output signal of OR element 105, analyzer unit 20 and diagnosis unit 30 are activated. They are only deactivated when analyzer unit 20 has detected a reduction in resulting setpoint torque Msetpoint by at least a predefined threshold absolute value and then a predefined diagnosis time has elapsed. To do so, resulting setpoint torque Msetpoint is sent by setpoint value forming unit 125 to analyzer unit 20. The predefined threshold absolute value may be calibrated in a suitable manner, e.g., on a test stand and/or in driving tests so that the diagnosis may be performed as quickly as possible after activation of analyzer unit 20 and diagnosis unit 30. In addition, the predefined threshold absolute value should be selected to be large enough to allow a reliable diagnosis. The predefined diagnosis time may also be calibrated suitably on a test stand and/or in driving tests so that it is selected to be as short as possible, but on the other hand, it is at least as long as required for the diagnosis described below. Actual charging pressure pl is also supplied by charging pressure sensor 40 to analyzer unit 20.

If, after detection of a reduction in resulting setpoint torque Msetpoint by at least the predefined threshold absolute value, the predefined diagnostic time has elapsed, analyzer unit 20 sends a deactivation signal to diagnosis unit 30 to deactivate the latter and then it deactivates itself. Resulting setpoint torque Msetpoint is also transmitted by setpoint value forming unit 125 to first trigger unit 25. If first trigger unit 25 finds that resulting setpoint torque Msetpoint exceeds a predefined limiting value, then it forms first trigger signal A1, in such a way that diverter valve 1 is operated in the closing direction to close completely. The predefined limiting value for resulting setpoint torque Msetpoint is calibrated suitably on a test stand and/or in driving tests, for example, so that operation of internal combustion engine 5 at a higher load is assumed for resulting setpoint torques Msetpoint above the predefined limiting value, and operation of the internal combustion engine at a lower load is assumed for resulting setpoint torques Msetpoint below the predefined limiting value. Resulting setpoint torque Msetpoint is thus a signal representing the load of internal combustion engine 5. At a higher load, diverter valve 1 is completely closed by first trigger signal A1 to be able to set required setpoint charging pressure plsetpoint. At a lower load, however, diverter valve 1 is moved into its opening direction by appropriate formation of first trigger signal A1 by first trigger unit 25 to prevent compressor pumping.

If first trigger unit 25 receives a set signal from OR element 105, it is switched into a diagnostic operating mode, switching back to normal operating mode for triggering of diverter valve 1, as known to those skilled in the art, on deactivation of analyzer unit 20 and diagnosis unit 30. The end of the diagnostic operating state for first trigger unit 25 is ascertained in first trigger unit 25, depending on resulting setpoint torque Msetpoint and the predefined diagnostic time, in the manner described above for deactivation of analyzer unit 20 and diagnosis unit 30. Thus if first trigger unit 25 is in the diagnostic operating mode and detects a resulting setpoint torque Msetpoint above the predefined limiting value, then it prompts diverter valve 1 via first trigger signal A1 to close completely. If first trigger unit 25 subsequently detects a reduction in resulting setpoint torque Msetpoint by more than the predefined threshold absolute value, then it retains first trigger signal A1 unchanged, so that diverter valve 1 should continue to remain completely closed. This causes compressor pumping, manifested in corresponding fluctuations in actual charging pressure pl and detected by analyzer unit 20 by comparison with a reference curve for the charging pressure assigned to the currently detected reduction in setpoint torque Msetpoint and stored in reference value memory 120 when there is a deviation by less than a predefined tolerance band. Various curves for the charging pressure as a function of various reductions in setpoint torque Msetpoint by more than the predefined absolute threshold value are therefore stored in reference value memory 120 and retrieved by analyzer unit 20 as a function of the currently prevailing reduction in setpoint torque Msetpoint by more than the predefined absolute threshold value. If the characteristic of actual charging pressure pl differs from the reference characteristic of reference value memory 120 assigned to the prevailing reduction in setpoint torque Msetpoint by more than the predefined tolerance range, then analyzer unit 20 delivers a set signal to diagnostic unit 30, so that the latter recognizes a defectively open jamming diverter valve 1 and delivers a set error signal F at its output. A defectively open jamming diverter valve 1 would actually have to close when there is triggering in the closing direction, but remains open in error. The predefined diagnostic time mentioned previously should be calibrated so that it corresponds at least to the time required from detection of the reduction in setpoint torque Msetpoint by at least the predefined absolute threshold value until generation of an error signal F possibly to be set by diagnostic unit 30.

According to an alternative example embodiment, reference value memory 120 is not necessary, but first trigger signal A1 is additionally sent from first trigger unit 25 to analyzer unit 20, as indicated with a dotted line in FIG. 2. In this case, no special diagnostic operation of first trigger unit 25 is necessary, nor is deactivation of analyzer unit 20 and diagnostic unit 30 necessary. Analyzer unit 20 and diagnostic unit 30 remain activated as of the time of activation, namely at least until a set error signal F is delivered at the output of diagnostic unit 30. As described, the diagnosis may be performed during normal operation of internal combustion engine 5 in this alternative embodiment. Thus, when the value for resulting setpoint torque Msetpoint falls below the predefined limiting value, first trigger signal A1 is formed in such a way that diverter valve 1 is moved from its completely closed position into its opening direction to prevent compressor pumping. If, starting from the opened state of diverter valve 1, the predefined limiting value for resulting setpoint torque Msetpoint is again exceeded, then first trigger unit 25 forms first trigger signal A1, in such a way that diverter valve 1 is operated back into the closing direction to be able to set desired setpoint charging pressure plsetpoint. If, in this situation, analyzer unit 20 detects an increase in actual charging pressure pl by more than a predefined threshold value SW when diverter valve 1 is triggered in the closing direction, then it delivers a set signal at its output, so that diagnostic unit 30 detects a defectively open jamming diverter valve 1 and delivers a set error signal F at its output. In this case, it is also not necessary to supply resulting setpoint torque Msetpoint to analyzer unit 20. Predefined threshold value SW is stored in a threshold value memory 110 and may be calibrated on a test stand and/or in driving tests, for example, so that it is not selected to be too low, for example, to be unable to detect as errors fluctuations in actual charging pressure pl which are not caused by a defectively open jamming diverter valve 1 and on the other hand should not be selected to be too great to ensure that errors which actually occur are also detectable.

In the alternative example embodiment, for the purpose of the most reliable possible diagnosis, analyzer unit 20 may also receive throttle valve opening angle α from throttle valve position sensor 80. Furthermore, in this alternative specific embodiment it is also possible for throttle valve angle α and actual charging pressure pl to be sent to first trigger unit 25. If, in first trigger unit 25, a load jump is detected from a very high load, i.e., at an opening angle α above a first predefined upper limiting value of 95%, for example, and an actual charging pressure pl, which is also above a predefined limiting value, to a very low load at which the throttle is almost closed and opening angle α is below a second predefined lower threshold value of 10%, for example, then diverter valve 1 is first moved from its closed position at the very high load into its opened position at the very low load by first trigger unit 25 via first trigger signal A1 and then in the state of very low load, first trigger signal A1 is formed, so that diverter valve 1 is operated back into its closing direction. If, in this closing movement of diverter valve 1 in the state of the very low load, analyzer unit 20 detects an increase in the charging pressure by more than predefined threshold value SW, then diverter valve 1 is in order; otherwise, it is jamming open and diagnostic unit 30 is prompted in the latter case to set error signal F. The increase in actual charging pressure pl with the closing of diverter valve 1 in the very low-load operating state may amount to 20 hPa, for example, so that a value of 15 hPa, for example, is suitable as threshold value SW. The increase in charging pressure in closing diverter valve 1 is a function of the rotational speed, so that the increase in charging pressure turns out to be greater at higher rotational speeds. To this end, threshold value SW may also be predefined as a function of engine rotational speed and/or turbine rotational speed. The rotational speed of the internal combustion engine 5 may be ascertained by a crankshaft angle sensor in the area of cylinder(s) 50 in a manner known to those skilled in the art and sent to threshold value memory 110. A characteristic line of predefined threshold values SW calibrated on a test stand and/or in driving tests may then be stored in threshold value memory 110 as a function of engine rotational speed n and addressed for the diagnosis as a function of prevailing rotational speed n.

In another alternative example embodiment, for the purpose of the most reliable possible diagnosis, it is also possible for actual mass flow ms through the throttle valve to be additionally supplied to analyzer unit 20 via the throttle valve, this mass flow being measured via a hot-film air mass flowmeter, for example, calculated from opening angle α of the throttle valve and the engine rotational speed or from the pressure ratio across the throttle valve. Furthermore, in this alternative specific embodiment, it is also possible for actual mass flow ms and actual charging pressure pl to be sent to first trigger unit 25. In the event of a load jump from a very high load, i.e., also from a very high actual mass flow, which is above a first predefined limiting value and a charging pressure which is also above a third predefined limiting value to a very low load, i.e., to a very low mass flow (through the throttle valve) which is below a second predefined limiting value, lower than the first predefined limiting value, diverter valve 1 is moved by first trigger unit 25 via first trigger signal A1 out of its closed position at very high values for mass flow, load and charging pressure, into its opened position at the very low mass flow (and very low load) and then is operated back into its closed position in the state of the very low mass flow (and load) when the charging pressure has been adequately reduced, i.e., has dropped below a fourth limiting value which is less than the third limiting value. If, in this closing movement of diverter valve 1, analyzer unit 20 detects an increase in the charging pressure by more than predefined threshold value SW in the state of very low load and very low mass flow, then diverter valve 1 is in order; otherwise, it is jamming open and diagnostic unit 30 is prompted to set error signal F. The threshold value may be predefined, e.g., as a function of the actual charging pressure, the actual pressure upstream from the compressor and the actual mass flow because these three variables in combination are a type of measure for the rotational speed of the turbocharger.

The volume flow may also be used as an alternative and similarly to the mass flow through the throttle valve. The pressure ratio across the compressor may also be used as an alternative and similarly to the charging pressure.

The method according to the present invention is explained below on the basis of the flow charts in FIGS. 3 through 6.

Figure 3:
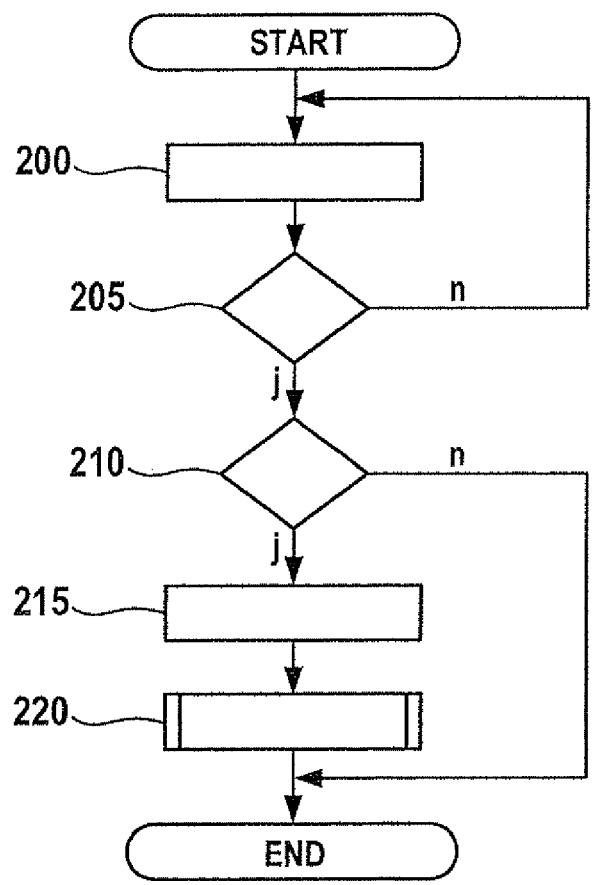
FIG. 3 shows a flow chart for a first alternative for ascertaining a suspected open jamming diverter valve.
Figure 4:
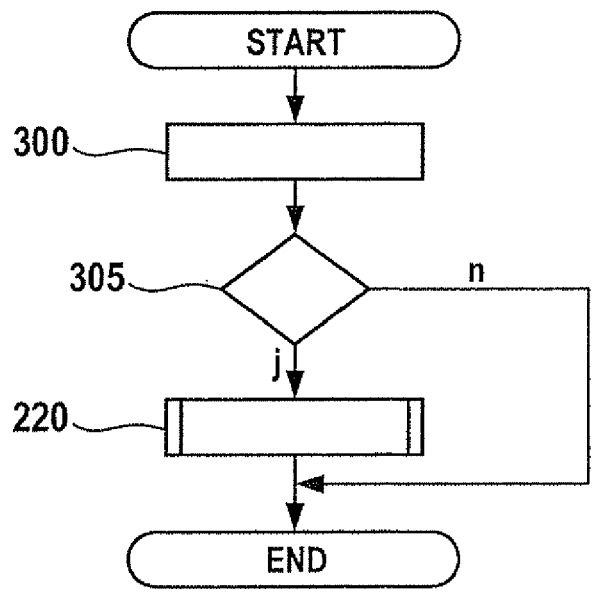
FIG. 4 shows a flow chart for a second alternative for ascertaining a suspected open jamming diverter valve.

The flow charts according to FIG. 3 and FIG. 4 relate to testing whether the diagnosis according to the present invention is to be performed, i.e., to test whether the output signal of OR element 105 may be set. The flow chart according to FIG. 3 covers the generation of the set signal of adaptation unit 90.

After the start of the program, setpoint value plsetpoint for the charging pressure is predefined at a program point 200 by setpoint value forming unit 125 and charging pressure actual value pl is input by charging pressure sensor 40. The program next branches off to a program point 205.

At program point 205, first comparison unit 85 checks on whether actual charging pressure pl is lower than setpoint charging pressure plsetpoint. If this is the case, the program branches off to a program point 210; otherwise, it branches back to program point 200.

At program point 210, adaptation unit 90 checks on whether the set signal was received by first preselection unit 85 for a time greater than predefined threshold value T, i.e., for longer than predefined threshold value T, charging pressure actual value pl having been found to be less than charging pressure setpoint value plsetpoint by first comparison unit 85. If this is the case, then the program branches off to a program point 215; otherwise, the program is terminated and a reset signal is sent to OR element 105.

At program point 215, a so-called undercharging error is detected, and the output signal of adaptation unit 90, which is sent to OR element 105, is set. Next the program branches off to a program point 220.

At program point 220, the diagnosis according to the present invention is performed on an open jamming diverter valve 1 as explained below according to the flow charts in FIG. 5 and FIG. 6. Next the program is terminated.

The flow chart according to FIG. 4 covers the formation of the set signal of second comparison unit 100. After starting the program, adaptation value AW is input into second comparison unit 100 at a program point 300. Next the program branches off to a program point 305.

At program point 305, second comparison unit 100 checks on whether adaptation value AW is greater than or equal to limiting value GW from limiting value memory 115. If this is the case, the program branches off to program point 220 and the diagnosis according to the present invention for an open jamming diverter valve 1 according to FIG. 5 or FIG. 6 is started. Otherwise, the program is terminated. After program point 220, the program is also terminated.

Figure 5:
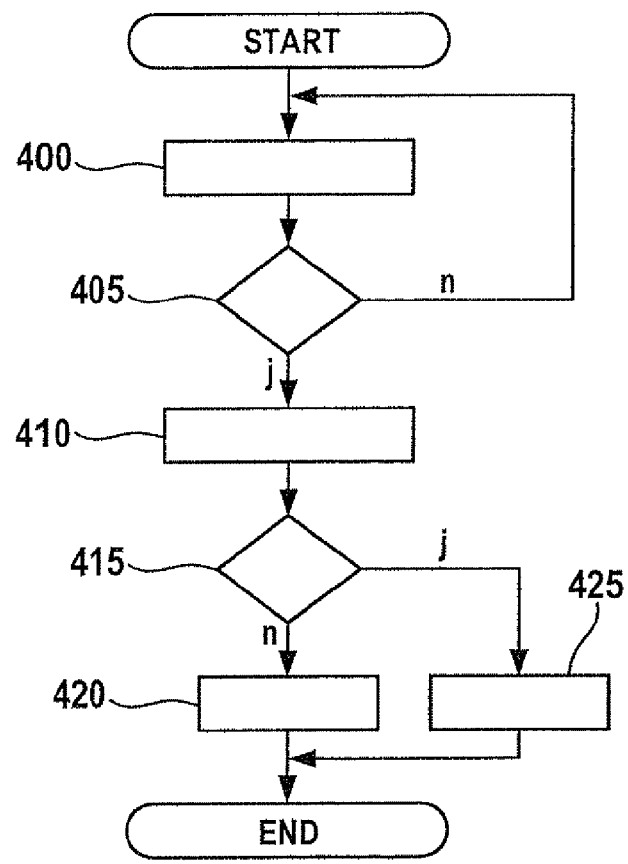
FIG. 5 shows a flow chart for a first alternative for a diagnosis of an open jamming diverter valve.

The program according to FIG. 5 covers the diagnosis for an open jamming diverter valve 1 on the basis of the absence of compressor pumping despite the closing triggering of diverter valve 1.

After the start of the program, resulting setpoint torque Msetpoint is entered into first trigger unit 25 and analyzer unit 20 at program point 400. The program next branches off to a program point 405.

At program point 405, first trigger unit 25 checks on whether there is a reduction in resulting setpoint torque Msetpoint by more than the predefined threshold absolute value, and first trigger signal A1 is formed, so that diverter valve 1 may be moved to its completely closed position. If this is the case, the program branches off to a program point 410; otherwise, it branches back to program point 400.

At program point 410, first trigger unit 25 retains the formation of first trigger signal A1 to bring diverter valve 1 into its completely closed position. The program next branches off to a program point 415.

At program point 415, analyzer unit 20 checks on whether the variation over time of actual charging pressure pl, which results from the reduction in resulting setpoint torque Msetpoint by more than the predefined threshold absolute value and with maintaining first trigger signal A1 for complete closing of diverter valve 1, differs from the variation over time of the charging pressure predefined for the detected reduction in setpoint torque Msetpoint by more than the predefined tolerance band. If this is the case, the program branches off to a program point 425; otherwise it branches off to a program point 420.

At program point 425, defective open jamming of diverter valve 1 is detected and error signal F is set by diagnostic unit 30. Next the program is terminated.

At program point 420, freedom from error is detected by analyzer unit 20 and error signal F of diagnostic unit 30 remains reset. Next the program is terminated.

Figure 6:
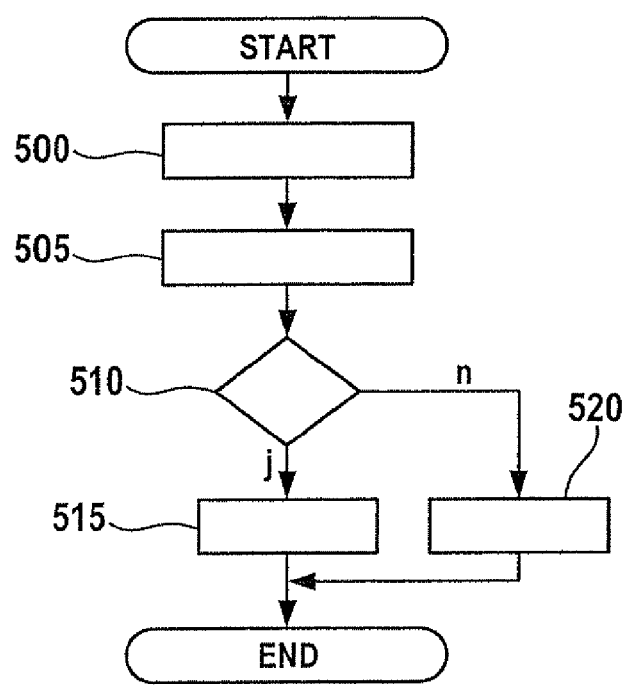
FIG. 6 shows a flow chart for a second alternative for a diagnosis of an open jamming diverter valve.

FIG. 6 covers the alternative example embodiment according to which defective open jamming of diverter valve 1 may be detected during normal operation of internal combustion engine and thus without any special diagnostic operation. After the start of the program, first trigger unit 25 triggers diverter valve 1 in the opening direction when a load jump is detected from a very high load, with a throttle valve opening above the first predefined limiting value and an actual charging pressure pl above the limiting value predefined for it, to a very low load in the throttle valve opening below the second predefined limiting value via a first trigger signal A1. The program next branches off to a program point 505.

At program point 505, first trigger unit 25 forms first trigger signal A1 after the opening of diverter valve 1, so that diverter valve 1 is moved back in the closing direction, namely for complete closing of diverter valve 1. The program next branches off to a program point 510.

At program point 510, analyzer unit 20 checks on whether, due to the closing triggering of diverter valve 1, an increase Δpl in actual charging pressure pl is greater than predefined threshold value SW, which is advantageously ascertained as a function of the prevailing engine rotational speed from threshold value memory 110. If this is the case, the program branches off to a program point 515; otherwise it branches off to a program point 520.

At program point 515, analyzer unit 20 detects freedom from error, and error signal F of diagnostic unit 30 remains reset. Next the program is terminated.

At program point 520, analyzer unit 20 detects an error and prompts diagnostic unit 30 to set error signal F. In this case, defective open jamming of diverter valve 1 is diagnosed. Next the program is terminated.

Instead of resulting setpoint torque Msetpoint, throttle valve opening angle α may also be analyzed accordingly for diagnosing open jamming diverter valve 1 according to the first specific embodiment. According to the first specific embodiment of the diagnosis that is described, then instead of a reduction in resulting setpoint torque Msetpoint, a reduction in throttle valve opening angle α by more than a predefined absolute threshold value which is applied accordingly is monitored, such a reduction in throttle valve opening angle being even more suitable for the diagnosis described here because the risk of compressor pumping when diverter valve 1 is closed increases directly with the closing of the throttle valve, whereas a low resulting setpoint torque Msetpoint may also be implemented even with greater opening of the throttle valve, e.g., by setting a delayed firing angle. However, the advantage of using resulting setpoint torque Msetpoint is that the load change is thus predictable with respect to the actual throttle valve opening and may thus be used at an early time to form first trigger signal A1.

The prerequisite for a reliable diagnostic result is also that the internal combustion engine is being charged during the diagnostic procedure for both alternatives of the diagnosis described here according to FIGS. 5 and 6, so that with the first alternative there cannot be any compressor pumping at all and with the second alternative the increase in charging pressure with the closing of the diverter valve is made possible. This means that turbine 60 must be operated with a second trigger signal A2 for the diagnosis, this signal ensuring adequate compressor performance for a reliable diagnostic result. A corresponding minimum value for second trigger A2 may then be calibrated suitably on a test stand and/or in driving tests.

The background for adaptation by adaptation unit 90 is that, when diverter valve 1 is defectively jamming open, for example, more driving power must be made available on the turbine side of the turbocharger, for example, to achieve the same charging pressure as with error-free diverter valve 1 because a portion of the volume flow delivered is pumped into circulation on the compressor side without benefit, i.e., without contributing to the charging pressure buildup. Adaptation value AW ensures that the required increase in driving power will be made available. Limiting value GW of limiting value memory 115 prevents "adaptation values AW" of charging pressure regulation for second trigger signal A2 from running away in an undesirable manner and/or allows error detection.

Diagnosis of a defectively open jamming diverter valve 1 may also be combined with a diagnosis of a defective closed jamming of diverter valve 1 in which diverter valve 1 is triggered in the opening direction to prevent compressor pumping in a load change from a higher load to a lower load. If compressor pumping is not detected and the load change was sufficiently great and quick, it is possible to be sure that the diverter valve is not jamming closed. Otherwise a closed jamming diverter valve is detected, i.e., a diverter valve which remains closed despite being triggered to open. Here again, the higher load is to be understood as supercharged operation of the internal combustion engine with the throttle valve largely opened above the first predefined threshold value and the lower load is to be understood as supercharged operation of the internal combustion engine with the throttle valve extensively closed with a degree of opening below the second predefined limiting value.

The chronological sequence in diagnosing a defectively open jamming diverter valve 1 and diagnosing a defectively closing jamming diverter valve 1 is irrelevant here.

The predefined tolerance range may also be calibrated suitably, e.g., on a test stand and/or in driving tests, in such a way that, on the one hand, the tolerance range is not too small to not allow differences in the two variations over time, which are not due to a defectively open jamming diverter valve, to result in an error message and on the other hand the tolerance range must not be too large to reliably detect defective open jamming of diverter valve 1.

Figure 7:
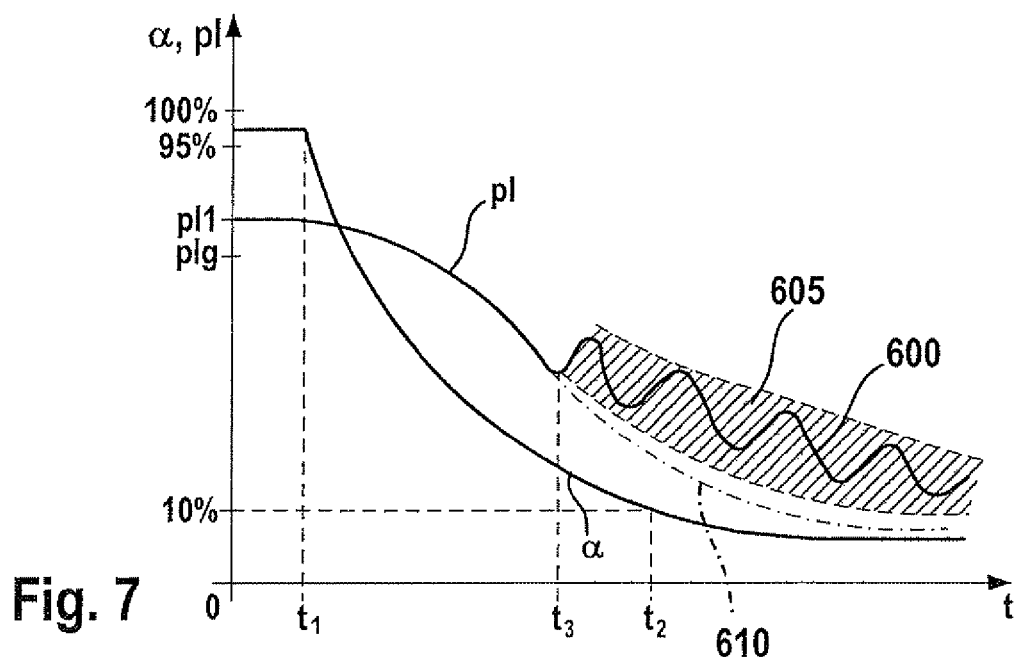
FIG. 7 shows a diagram of the curve of the throttle valve opening angle and the actual charging pressure over time for a first embodiment of the present invention.

FIG. 7 shows the variation over time of throttle valve angle α detected by throttle valve position sensor 80 and of actual charging pressure pl detected by charging pressure sensor 40 over time t for the case of a load reduction from a higher load to a lower load. At a first point in time $t_1$ throttle opening angle α has a value of more 95% and thus a value above the first predefined limiting value. At first point in time $t_1$ throttle valve angle α drops due to a decline in a driver's desired torque FW such that at a second point in time $t_2$ which follows first point in time $t_1$ throttle valve angle α reaches the second predefined limiting value of 10% opening angle in this example and then falls below it. Throttle valve opening angle α thus moves from a largely opened position above the first predefined limiting value into a largely closed position below the second predefined limiting value. In this case, a value of 85%, based on the difference between the first predefined limiting value and the second predefined limiting value, may be selected as an example of the predefined limiting absolute value for the reduction in throttle valve opening angle α. In the example according to FIG. 7, the reduction in throttle valve opening angle α is thus greater than the predefined threshold absolute value of 85% throttle valve opening angle difference in this example. Thus with a curve of throttle valve opening angle α according to FIG. 7 between first point in time $t_1$ and second point in time $t_2$, the characteristic of actual charging pressure pl is analyzed in analyzer unit 20 for the presence of compressor pumping because triggering of diverter valve 1 to open fails to occur because of the diagnosis that has been activated for the load reduction described here by more than the predefined threshold absolute value. Actual charging pressure pl thus assumes a first value pl1 above its predefined limiting value plg at first point in time $t_1$. Actual charging pressures above limiting value plg predefined for them characterize operation of internal combustion engine 5 at a higher load. With the reduction in load due to the reduction in the driver's desired torque FW, for example, setpoint charging pressure plsetpoint and with it actual charging pressure pl are thus also reduced as of first point in time $t_1$. It is assumed here that after first point in time $t_1$, the driver's desired torque FW is decreased accordingly, e.g., in that the accelerator pedal is completely released starting from being operated up to close to the stop. After first point in time $t_1$, actual charging pressure pl thus drops. Without opening diverter valve 1, after third point in time $t_3$ following first point in time $t_1$ compressor pumping is expected, as depicted in FIG. 7 according to reference numeral 600 in the form of fluctuations in actual charging pressure pl. After second point in time $t_2$ which follows third time $t_3$ analyzer unit 20 begins to compare the characteristic of actual charging pressure pl with the reference characteristic obtained from reference value memory 120, which corresponds to compressor pumping 600 and/or to compare with a predefined tolerance range 605 formed around this reference characteristic 600 on the basis of its activation and according to the first specific embodiment of the diagnosis, this tolerance range being shown with hatching in FIG. 7. However, if diverter valve 1 remains opened with the drop in load shown in FIG. 7, a characteristic 610 of actual charging pressure pl is established, represented with a dash-dot line in FIG. 7 and situated outside of tolerance range 605, namely below tolerance range 605. Analyzer unit 20 thus recognizes that the actual characteristic of actual charging pressure pl according to reference numeral 610 is outside of predefined tolerance range 605, so that a defectively open jamming diverter valve 1 is detected.

Figure 8:
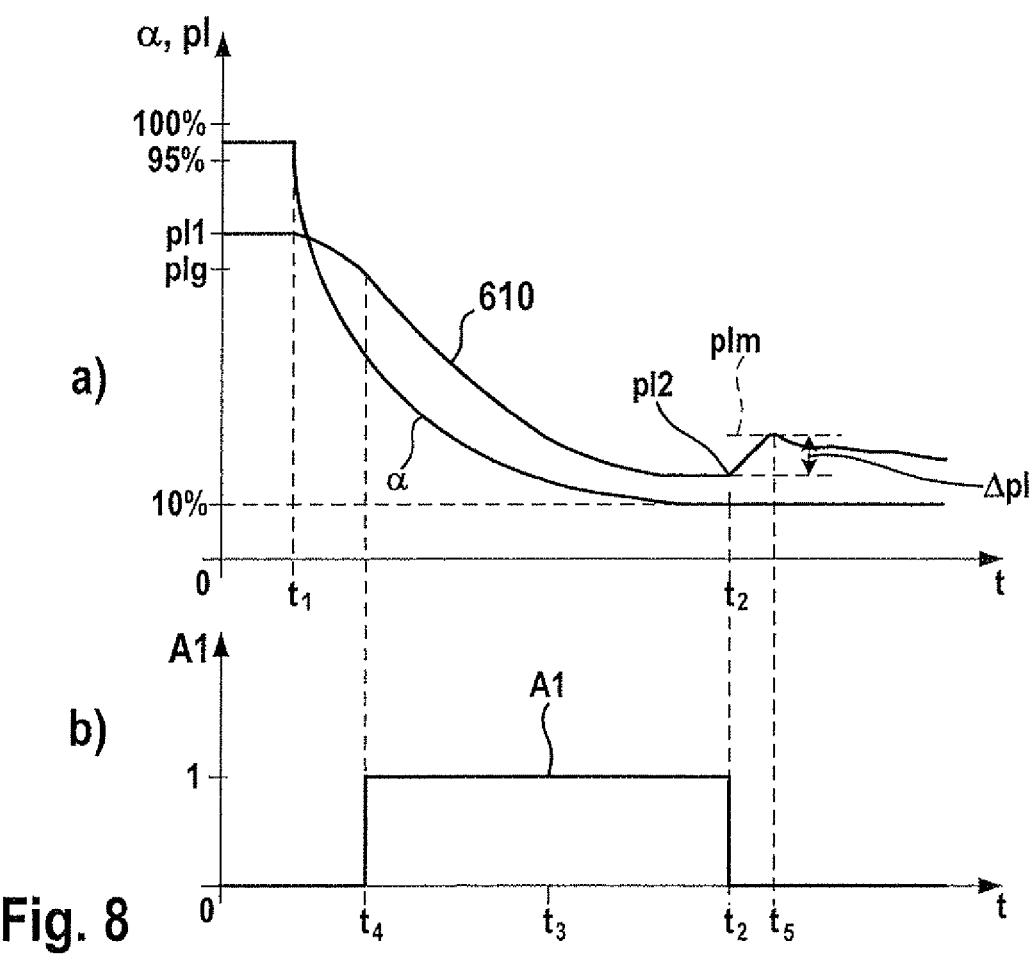
FIG. 8a shows a curve of the throttle valve opening angle and the actual charging pressure over time for a second embodiment of the present invention.
FIG. 8b shows a curve of a first trigger signal for a diverter valve over time according to the second embodiment of the present invention.

The diagnosis according to the second alternative example embodiment is depicted on the basis of the variations over time, as shown in FIGS. 8a and 8b. FIG. 8a, like FIG. 7, illustrates the variation over time of throttle valve opening angle α and of actual charging pressure pl, the same load drop being assumed here as in FIG. 7. Thus the variation over time of throttle valve opening angle α in FIG. 8a corresponds to the variation over time of throttle valve angle α in FIG. 7. The same thing is also true of the variation over time of actual charging pressure pl, but it behaves according to characteristic 610 shown with dash-dot lines in FIG. 7 until first point in time $t_1$ and from first point in time $t_1$ to following second point in time $t_2$. This is because diverter valve 1 is opened, as shown in FIG. 8b on the basis of the variation over time of first trigger signal A1, already at a fourth point in time $t_4$ which is between first point in time $t_1$ and third point in time $t_3$, at which the start of compressor pumping would be located without opening of diverter valve 1 according to FIG. 7. At fourth point in time $t_4$ it jumps from zero to one and thus from a final triggering to an opening triggering, so that diverter valve 1 at fourth time $t_4$ is to be moved from the completely closed position into the completely opened position. On detecting that the second lower limiting value of 10% in this example for throttle valve opening angle α has been reached at second point in time $t_2$ or shortly thereafter, in the second embodiment of the present invention, first trigger signal A1 is again reset from one to zero and thus the diverter valve is triggered into its completely closed position. As a result of the closing of diverter valve 1 at second point in time $t_2$ in this example, an increase Δpl in the actual charging pressure which is greater than predefined threshold value SW of threshold value memory 110 is expected. Increased Δpl in the actual charging pressure after second point in time $t_2$ is ascertained by analyzer unit 20 by checking on when actual charging pressure pl has reached a maximum value after second point in time $t_2$. This is the case at fifth point in time t5 which follows second point in time $t_2$. This maximum, labeled as plm in FIG. 8, minus actual charging pressure value pl2 which is reached at second point in time $t_2$, then yields in analyzer unit 20 an increase Δpl, which is then compared with predefined threshold value SW in the manner already described. If diverter valve 1 is defectively jamming when open, then analyzer unit 20 will detect no increase Δpl above predefined threshold value SW of threshold value memory 110 after second point in time $t_2$ and thus a defectively open jamming diverter valve 1 will be diagnosed.

What is claimed is:

1. A method for diagnosing a diverter valve of an internal combustion engine having a compressor, comprising:
    triggering the diverter valve, wherein the triggering takes place in such a way that a movement of the diverter valve in a direction of a closing position is expected;
    analyzing a variation over time of a charging pressure of the internal combustion engine resulting from the triggering of the diverter valve;
    determining an open jamming status of the diverter valve when the variation over time of the charging pressure is not plausible with an expected variation over time for a diverter valve moved in the direction of the closing position; and
    performing one of the following:
        (i) in the case of a transition from a higher load state of the internal combustion engine, in which state the diverter valve is triggered in the direction of the closing position, to a lower load state of the internal combustion engine, suspending a triggering of the diverter valve in an opening direction, performing a check to detect whether compressor pumping occurs as a result, and determining the open jamming status of the diverter valve if no compressor pumping occurs; and
        (ii) starting from an operating state with an opened diverter valve, triggering the diverter valve in the direction of the closing position, and determining the open jamming status of the diverter valve if no increase in the charging pressure above a predefined threshold value is detected as a result of the triggering of the diverter valve in the direction of the closing position.

2. The method as recited in claim 1, further comprising:
    checking whether a predefined charging pressure is reached within a predefined time after the diverter valve is triggered in the direction of the closing position;
    wherein the analyzing of the variation over time of a charging pressure is activated if the predefined charging pressure is not reached within the predefined time after the diverter valve is triggered.

3. The method as recited in claim 1, wherein the analyzing of the variation over time of the charging pressure is activated in a charging pressure adaptation, in which an adaptation variable for maintaining a predefined charging pressure reaches a predefined limiting value.

4. The method as recited in claim 1, wherein (i) is performed.

5. The method as recited in claim 1, wherein (ii) is performed.

6. A device for diagnosing a diverter valve of an internal combustion engine having a compressor, comprising:
- a triggering unit configured to trigger the diverter valve, wherein the triggering takes place in such a way that a movement of the diverter valve in a direction of a closing position is expected;
- an analyzer unit configured to analyze a variation over time of a charging pressure of the internal combustion engine resulting from the triggering of the diverter valve; and
- a diagnostic unit configured to determine an open jamming status of the diverter valve when the variation over time of the charging pressure is not plausible with an expected variation over time for a diverter valve moved in the direction of the closing position, by performing one of the following:
  - (i) in the case of a transition from a higher load state of the internal combustion engine, in which state the diverter valve is triggered in the direction of the closing position, to a lower load state of the internal combustion engine, suspending a triggering of the diverter valve in an opening direction, performing a check to detect whether compressor pumping occurs as a result, and determining the open jamming status of the diverter valve if no compressor pumping occurs; and
  - (ii) starting from an operating state with an opened diverter valve, triggering the diverter valve in the direction of the closing position, and determining the open jamming status of the diverter valve if no increase in the charging pressure above a predefined threshold value is detected as a result of the triggering of the diverter valve in the direction of the closing position.

7. A method of diagnosing a diverter valve of an internal combustion engine having a compressor, comprising:
- detecting a load transition from a high load state to a low load state, wherein the high load state is based on a throttle valve opening above a first predetermined threshold and an actual charging pressure above a second predetermined threshold, wherein the low load state is based on the throttle valve opening below a third predetermined threshold;
- responsive to the detecting, triggering a diverter valve in an open position;
- subsequently, triggering the diverter valve back to a closed position;
- measuring a change in actual charging pressure;
- comparing the change in actual charging pressure with a fourth predetermined threshold value; and
- activating, responsive to the change being less than the fourth predetermined threshold value, an error signal to indicate the diverter valve is stuck open.

8. The method of claim 7, further comprising:
- activating, responsive to the change being greater than the fourth predetermined threshold value, an operation signal to indicate the diverter valve is operating normally.

9. A method of diagnosing a diverter valve of an internal combustion engine having a compressor, comprising:
- comparing a vehicle parameter with a predetermined parameter threshold;
- based on the comparing, triggering a signal to close a diverter valve;
- measuring a variation over time of an actual charging pressure value;
- comparing the variation with a predetermined tolerance band; and
- activating, based on the comparing, an error signal to indicate the diverter valve is stuck open, responsive to the variation exceeding the predetermined tolerance band.

10. The method of claim 9, wherein the vehicle parameter is a reduction in resulting setpoint torque and the predetermined parameter threshold is a threshold degree of change in resulting setpoint torque, such that the triggering is responsive to the reduction in resulting setpoint torque being of a greater degree than the threshold degree of change in resulting setpoint torque.

11. The method of claim 9, wherein the vehicle parameter is a reduction in throttle valve opening angle and the predetermined parameter threshold is a threshold degree of change in the throttle valve opening angle, such that the triggering is responsive to the reduction in throttle valve opening angle being of a greater degree than the threshold degree of change in throttle valve opening angle.

12. The method of claim 9, further comprising:
- charging the internal combustion engine during the measuring of the variation.

13. The method of claim 9, further comprising:
- measuring the actual charging pressure value from a charging pressure sensor;
- comparing the actual charging pressure value with a predetermined threshold value for charging pressure; and
- producing, responsive to the actual charging pressure value being less than the predetermined threshold value for charging pressure for a period of time greater than a predetermined time threshold, an undercharging error signal.

14. The method of claim 9, further comprising:
- measuring the actual charging pressure value from a charging pressure sensor;
- forming an adaptation value based on an amount of time where the actual charging pressure value is less than a predetermined threshold value for charging pressure;
- producing, responsive to the adaptation value being greater than a predetermined adaptation threshold, an undercharging error signal.

15. The method of claim 9, wherein the method of diagnosing the diverter valve is preformed responsive to an undercharging error signal.

16. The method of claim 9, wherein the vehicle parameter is based on a torque demand indicated by a driver.

17. The method of claim 16, wherein the torque demand indicated by the driver is based on a position of an acceleration input device.

18. The method of claim 16, wherein the vehicle parameter is further based on additional torque demand from at least one other source.

19. A device for diagnosing a diverter valve of an internal combustion engine having a compressor, comprising:
- an trigger unit having a processor, a memory, and at least one input to receive a vehicle parameter, wherein the trigger unit is configured to compare the vehicle parameter with a predetermined parameter threshold stored in the memory and trigger a diverter valve based on the comparing; and
- an analyzer unit having a processor, a memory, and at least one input connected to a charging pressure sensor to measure a variation over time of an actual charging pressure and compare the variation with a predetermined tolerance band, and having an open jamming error output, which is activated based on the comparing in the analyzer.

* * * * *